(12) United States Patent
Stinesen et al.

(10) Patent No.: US 6,940,802 B1
(45) Date of Patent: Sep. 6, 2005

(54) OPTICAL SCANNING DEVICE WITH AN ACTUATOR COIL BENT AROUND THE BEAM PATH

(75) Inventors: Bernardus J. Stinesen, Eindhoven (NL); Thomas A. J. Haus, Eindhoven (NL); Pierre Van Eijndhoven, Tilburg (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/566,431

(22) Filed: May 8, 2000

(30) Foreign Application Priority Data

May 7, 1999 (EP) .................................. 99201441

(51) Int. Cl.$^7$ ............................................... G11B 7/09
(52) U.S. Cl. ........................... 369/112.2; 369/44.15; 369/135
(58) Field of Search ....................... 369/112.2, 44.14, 369/135; 359/903, 823, 813, 814

(56) References Cited

U.S. PATENT DOCUMENTS

| | | | | |
|---|---|---|---|---|
| 4,813,033 A | * | 3/1989 | Baasch et al. ........... | 369/44.16 |
| 4,958,335 A | | 9/1990 | Takeda et al. | |
| 5,062,095 A | * | 10/1991 | Horikawa et al. ....... | 369/44.21 |
| 5,159,482 A | * | 10/1992 | Heinrich .................... | 359/199 |
| 6,034,940 A | * | 3/2000 | Lee ............................ | 369/244 |
| 6,414,931 B1 | * | 7/2002 | Maeda et al. ........... | 369/112.24 |
| 6,507,554 B2 | * | 1/2003 | Son et al. ................... | 369/244 |
| 6,510,011 B2 | * | 1/2003 | Hendriks et al. ........... | 359/823 |

* cited by examiner

Primary Examiner—Aristotelis M. Psitos
(74) Attorney, Agent, or Firm—Michael E. Belk

(57) ABSTRACT

An optical scanning device scans an information track which is present on an information carrier. The scanning device includes a radiation source, a lens system with an optical axis for focusing a radiation beam supplied by the radiation source into a scanning spot on the information carrier, and a focusing actuator for displacing the lens system relatively to a basic part of the scanning device in a direction parallel to the optical axis. The actuator includes an electric coil which is arranged around the lens system and provided with a passage for a radiation beam path which extends in a direction perpendicular to the optical axis. The electric coil is provided around the lens system by means of a winding process, the passage being provided in the coil by bending the parts of the coil wires which are present near the radiation beam path, in a direction substantially parallel to the optical axis. In a preferred embodiment, said parts of the coil wires are bent during the winding process by means of a mandrel which is present in the passage during the winding process. In this manner, the optical scanning device according to the invention can be manufactured in a simple manner by means of a reduced number of process steps. The optical scanning device can be used in an optical disc player.

7 Claims, 4 Drawing Sheets

OPTICAL SCANNING DEVICE WITH AN ACTUATOR COIL BENT AROUND THE BEAM PATH

Figure 1:
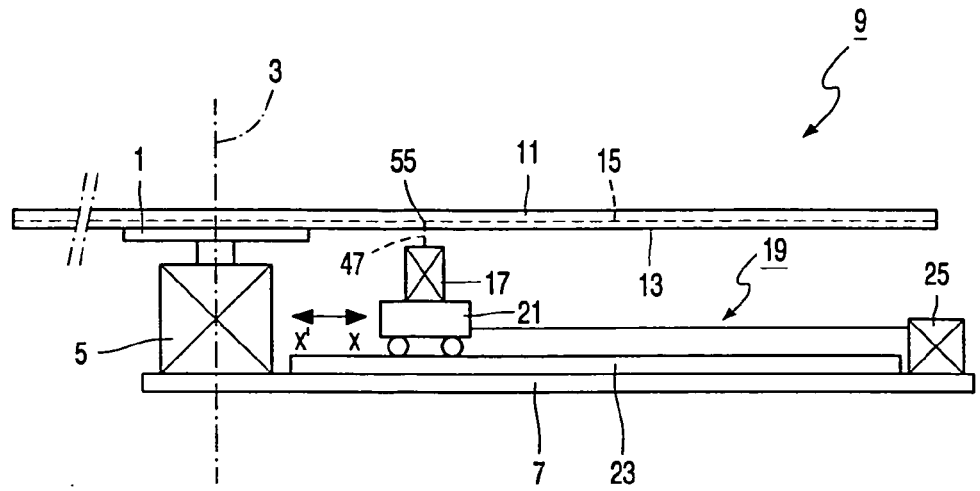

The invention relates to an optical scanning device for scanning an information track of an optically scannable information carrier, which scanning device is provided with a radiation source, an optical lens system with an optical axis for focusing a radiation beam supplied, in operation, by the radiation source into a scanning spot on the information carrier, and an actuator for displacing the lens system relatively to a basic part of the scanning device in a direction parallel to the optical axis, the actuator being provided with an electric coil arranged around the lens system, which electric coil is provided with wire portions which extend substantially perpendicularly to the optical axis and, viewed in a direction parallel to the optical axis, are arranged next to one another, and which coil is also provided with a passage for a radiation beam path extending substantially perpendicularly to the optical axis.

The invention also relates to an optical player comprising a table which can be rotated about an axis of rotation, an optical scanning device including an optical lens system for scanning an information track of an optically scannable information carrier which can be placed on the table, and a displacement device by means of which at least the lens system of the scanning device can be displaced, in operation, with respect to the axis of rotation mainly in a radial direction.

An optical scanning device and an optical player of the types mentioned in the opening paragraphs are disclosed in U.S. Pat. No. 4,958,335. In the known optical player and the optical scanning device employed therein, the radiation source of the scanning device is secured to a stationary frame of the player. The basic part of the scanning device is secured to a slide which can be displaced in the radial direction by means of the displacement device of the player. The radiation beam path, along which the radiation beam is guided from the radiation source to the lens system, extends in the radial direction wherein the basic part and the lens system of the scanning device can be displaced by means of the displacement device. A mirror is attached to the basic part, by means of which the radiation beam guided along the radiation beam path is reflected in the direction of the optical axis of the lens system. By means of the actuator of the scanning device, the lens system can be displaced relatively to the basic part in a direction parallel to the optical axis, so that the radiation beam is focused on the information carrier to be scanned. Since the radiation source is secured to the stationary frame, a mass to be displaced by means of the actuator in a direction parallel to the optical axis, and a mass to be displaced by means of the displacement device in the radial direction are limited substantially, while, in addition, the dimensions of said masses to be displaced are limited substantially.

In the known scanning device, the electric coil of the actuator has rectangular windings which each comprise two opposite first wire portions and two opposite second wire portions. In the manufacture of the scanning device, the coil has to be manufactured first in a separate phase, whereafter the coil is provided around the lens system. In this process, the first wire portions of the coil are glued onto an upper side of a holder of the lens system, said upper side, in operation, facing the information carrier. Subsequently, the two second wire portions of each winding are bent so as to be at right angles with respect to the first wire portions and glued onto two opposing side faces of the holder. The second wire portions, which in the position thus obtained extend substantially perpendicularly to the optical axis and, viewed in a direction parallel to the optical axis, are arranged next to one another, cooperate, in operation, with a magnetic circuit which is attached to the basic part. At the location of the second wire portions, the magnetic circuit generates a magnetic field which is directed substantially perpendicularly to the second wire portions and perpendicularly to the optical axis, so that by the cooperation between the magnetic field and a current in the coil a Lorentz force is generated which is directed substantially parallel to the optical axis. The passage in the coil for the radiation beam path is obtained in that the first wire portions of the coil are situated on the above-mentioned upper side of the holder, and the second wire portions of the coil are situated on the above-mentioned side faces of the holder, said passage being situated between the two side faces of the holder. As a result, the radiation beam path and the mirror can be arranged, viewed in a direction parallel to the optical axis, in the direct vicinity of the lens system, so that the dimensions of the known scanning device, viewed in a direction parallel to the optical axis, are limited substantially.

A drawback of the known optical scanning device and the known optical player resides in that the manufacture and provision of the electric coil of the actuator requires a relatively large number of process steps.

It is an object of the invention to provide an optical scanning device and an optical player of the types mentioned in the opening paragraphs, wherein the electric coil and the passage for the radiation beam path formed in said coil can be more readily provided around the lens system by means of a smaller number of process steps.

To achieve this, an optical scanning device in accordance with the invention is characterized in that the electric coil is provided around the lens system by means of a winding process, the passage in the coil being formed by bending further wire portions of the coil, which are situated near the radiation beam path, in a direction substantially parallel to the optical axis.

To achieve this goal, an optical player in accordance with the invention is characterized in that the optical scanning device employed therein is an optical scanning device in accordance with the invention.

Since the coil of the optical scanning device in accordance with the invention is provided around the lens system by means of a winding process, said coil is not manufactured first in a separate phase, during the manufacture of the scanning device, before it is provided around the lens system, but instead, during the manufacture of the coil by means of the winding process, the coil is also provided around the lens system. As a result, the number of necessary process steps to manufacture the scanning device is reduced. Since the passage in the coil is formed by bending further wire portions of the coil which are situated near the radiation beam path, only a relatively small part of the coil is bent during the manufacture of the scanning device, so that the manufacture of the coil is simplified.

A particular embodiment of an optical scanning device in accordance with the invention is characterized in that the further wire portions of the coil are bent in said direction during the winding process by means of a mandrel which, during the winding process, is arranged in the passage. In this particular embodiment, the number of necessary process steps in the manufacture of the scanning device is further reduced in that the passage in the coil is already provided during the winding process. The mandrel has, for example, a smooth, rounded guide surface which is obliquely arranged with respect to the optical axis. During the winding process, the further wire portions of the coil slide over the guide surface of the mandrel, under the influence of a tensile force present in the coil wires, in an oblique direction with respect to the optical axis, so that the further wire portions are bent in a simple and accurate manner in a direction substantially parallel to the optical axis, resulting in the formation of the passage in the coil.

A further embodiment of an optical scanning device in accordance with the invention is characterized in that the further wire portions of the coil are bent in the above-mentioned direction after the winding process. Since, in this further embodiment, the further wire portions are bent after the winding process, the winding process for manufacturing and providing the coil is substantially simplified.

Yet another embodiment of an optical scanning device in accordance with the invention is characterized in that the coil is wound in a coil holder which is attached to the lens system and which is provided, near the passage, with a curved seating for the further wire portions of the coil. Said curved seating enables the further wire portions to be more accurately positioned, during bending, around the passage to be formed.

A particular embodiment of an optical scanning device in accordance with the invention is characterized in that the scanning device is provided with a further actuator for displacing the lens system relatively to the basic part in a radial direction at right angles to the optical axis and at right angles to the information track to be scanned, the further actuator being provided with two electric coils which, viewed in the radial direction, are provided on either side of the lens system, and the radiation beam path extending substantially at right angles to the radial direction between the two coils of the further actuator, while the radiation source is attached to the basic part. By means of the further actuator, the lens system can be accurately positioned in the radial direction during scanning the information track, so that said information track is accurately followed by the scanning device. Since both coils of the further actuator are situated, viewed in the radial direction, on either side of the lens system, and the radiation beam path extends, substantially perpendicularly to the radial direction, between the two coils, the coils of the further actuator are situated outside the radiation beam path, so that the shape and dimensions of these coils do not have to be adapted to the position of the radiation beam path.

These and other aspects of the invention will be apparent from and elucidated with reference to the embodiments described hereinafter.

Figure 3:
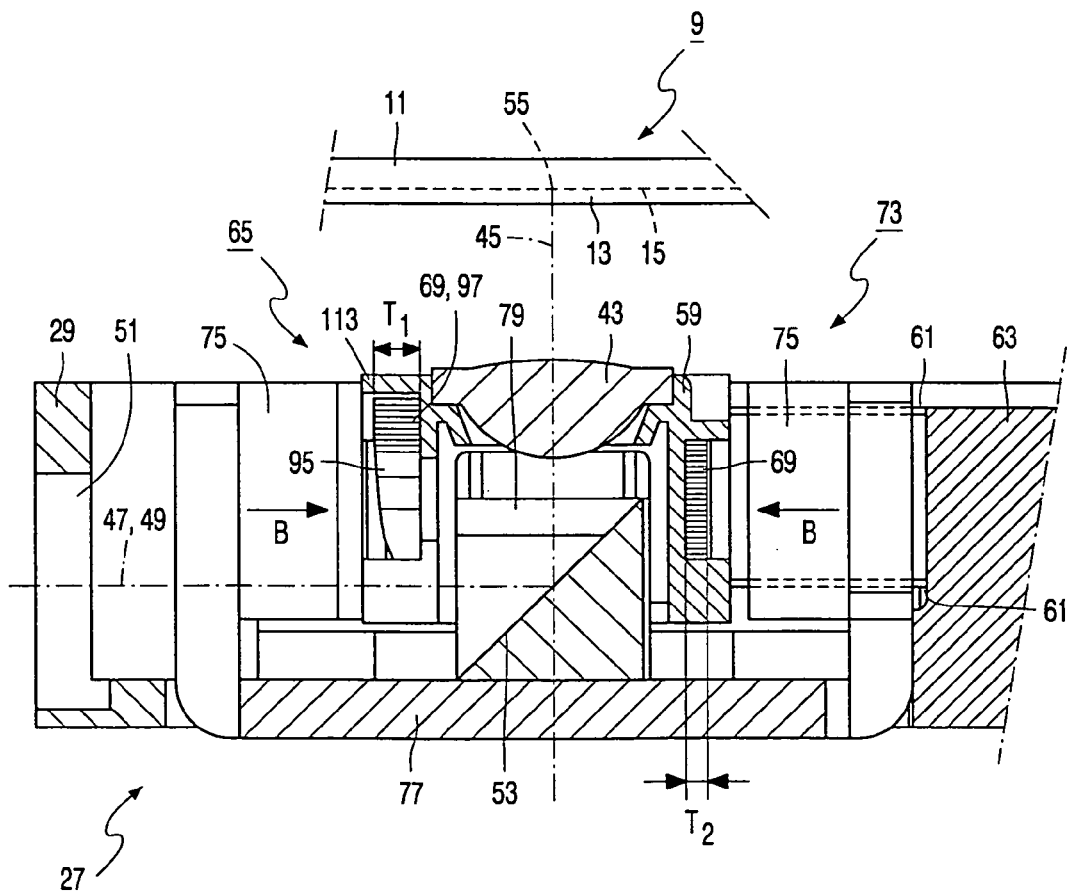
Figure 2:
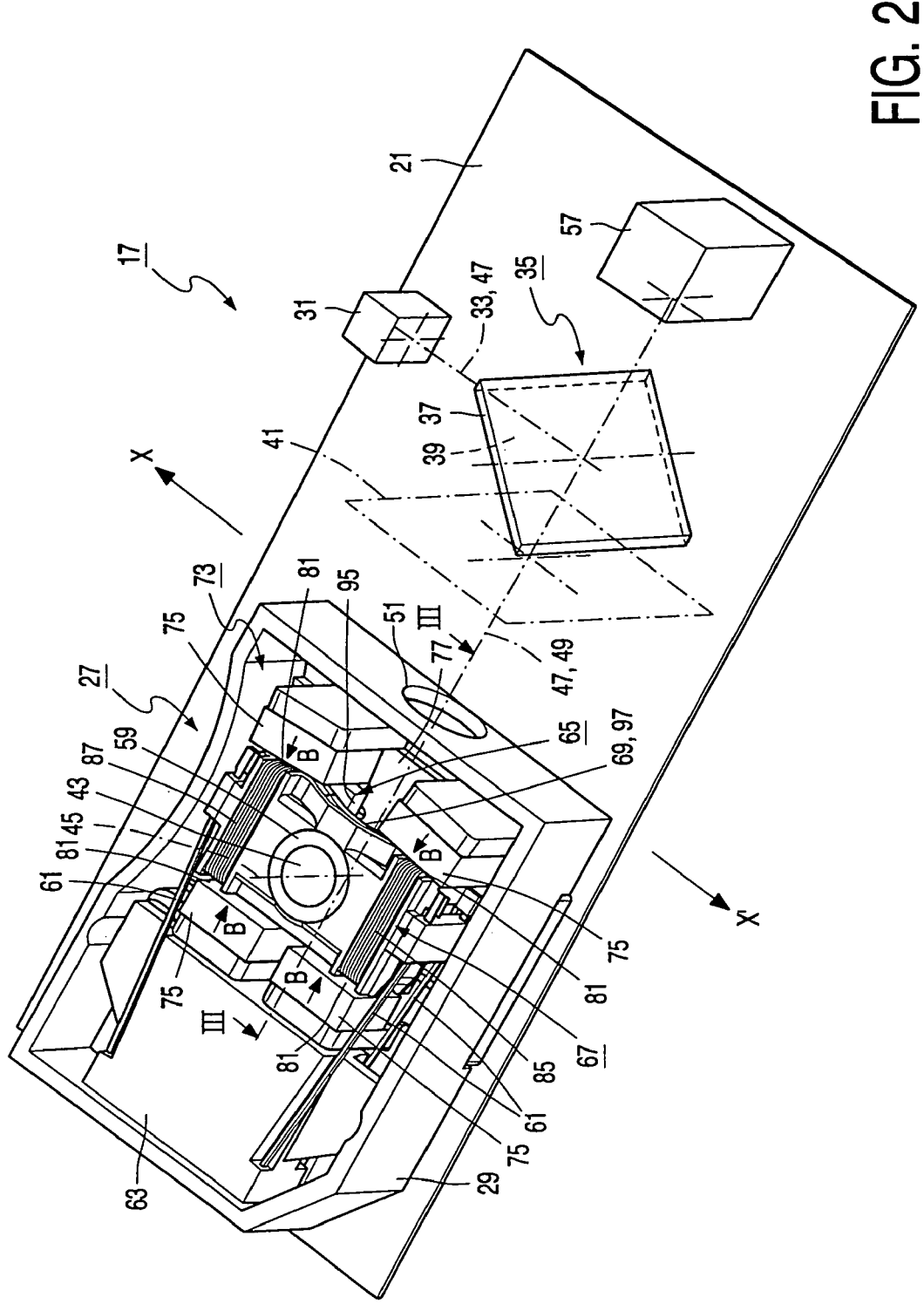
Figure 4:
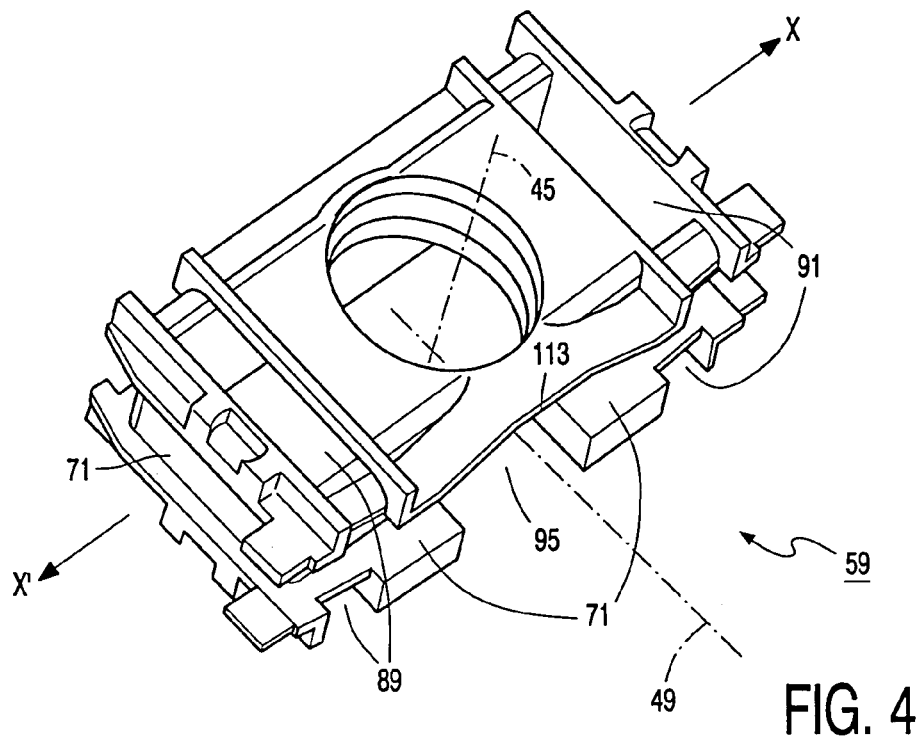
Figure 5:
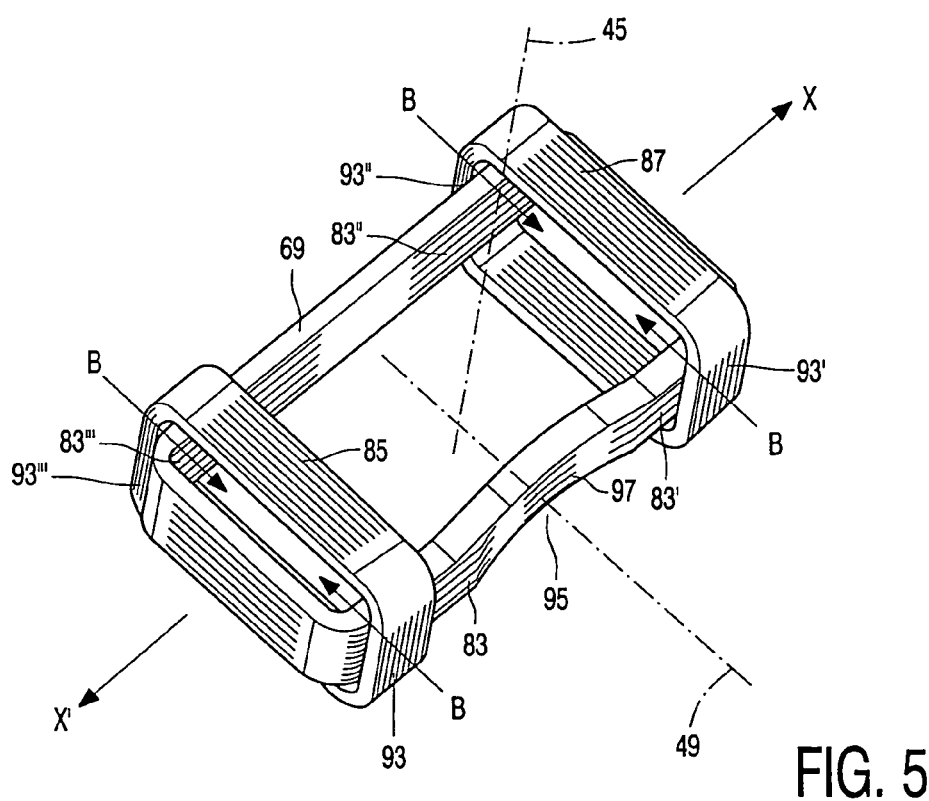
Figure 6A:
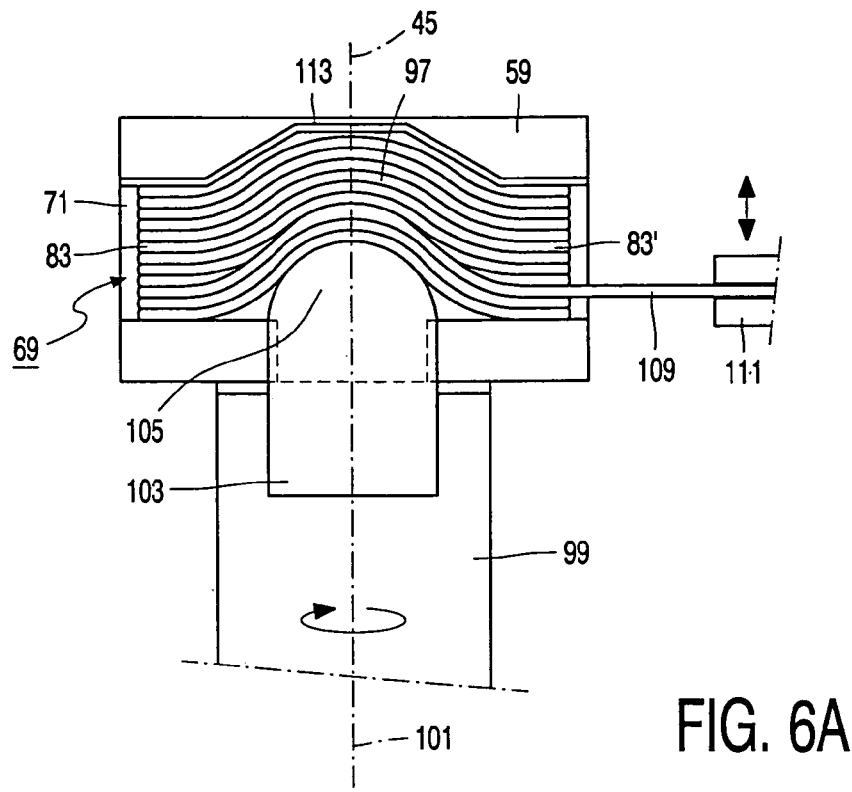
Figure 6B:
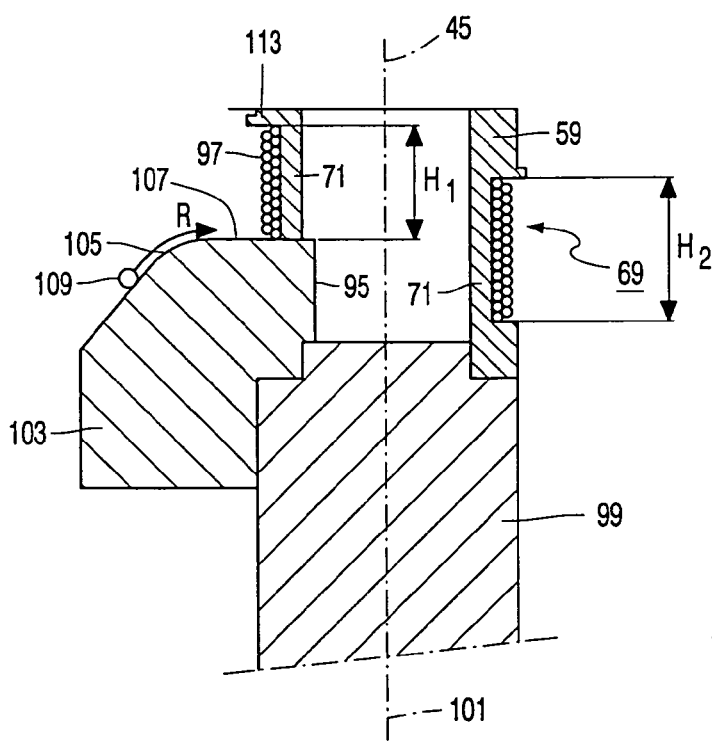

In the drawings:

FIG. 1 diagrammatically shows an optical player in accordance with the invention, FIG. 2 shows an optical scanning device in accordance with the invention, which is used in the optical player in accordance with FIG. 1, FIG. 3 is a sectional view taken on the line III—III in FIG. 2, FIG. 4 shows a holder of a lens system of the scanning device in accordance with FIG. 2, FIG. 5 shows an assembly of electric coils provided on the holder in accordance with FIG. 4, and FIGS. 6a and 6b diagrammatically show a winding process for providing one of the coils of the assembly in accordance with FIG. 5.

FIG. 1 diagrammatically shows an optical player in accordance with the invention, which comprises a table 1 which can be rotated about an axis of rotation 3 and which can be driven by an electric motor 5 which is secured on a frame 7. On the table 1, an optically scannable information carrier 9, such as a CD, can be placed which is provided with a disc-shaped carrier 11 and a transparent protective layer 13. A side of the carrier 11 adjoining the protective layer 13 forms an information layer 15 of the information carrier 9 on which a spiral-shaped information track is present. The optical player further comprises an optical scanning device 17 in accordance with the invention for optically scanning the information track of the information carrier 9. By means of a displacement device 19 of the optical player, the scanning device 17 can be displaced relatively to the axis of rotation 3 substantially in two opposite radial directions X and X'. For this purpose, the scanning device 17 is attached to a slide 21 of the displacement device 19 which is further provided with a straight guide 23, which is provided on the frame 7 and extends parallel to the X-direction, over which guide the slide 21 is displaceably guided, and with an electric motor 25 by means of which the slide 21 can be displaced over the guide 23. In operation, an electrical control unit of the optical player, which is not shown in the drawings, controls the motors 5 and 25 in such a manner that the information carrier 9 is made to rotate about the axis of rotation 3 and, simultaneously, the scanning device 17 is displaced parallel to the X-direction, in such a manner that the spiral-shaped information track present on the information carrier 9 is scanned by the scanning device 17. During scanning, information present on the information track can be read by the scanning device 17, or information can be written by the scanning device 17 on the information track.

The optical scanning device 17 in accordance with the invention which is used in the optical player in accordance with the invention is shown in FIG. 2, partly in detail and partly diagrammatically. The scanning device 17 is provided with an optical scanning unit 27 which comprises a housing 29 attached to the slide 21. FIG. 2 also shows the radial directions of movement X and X' of the slide 21. The scanning device 17 is further provided with a radiation source 31, such as a semiconductor laser, which radiation source is also attached to the slide 21 and comprises an optical axis 33. The scanning device 17 further includes a radiation beam splitter 35 which comprises a transparent plate 37 which is arranged at an angle of 45° with respect to the optical axis 33 of the radiation source 31, said transparent plate being also attached to the slide 21 and including a reflective surface 39 which faces the radiation source 31. The scanning device 17 further comprises a collimator lens 41, only diagrammatically shown in FIG. 2, which is also attached to the slide 21 and is arranged between the transparent plate 37 and the scanning unit 27. The scanning unit 27 comprises an optical lens system 43 having an optical axis 45. In operation, the radiation source 31 generates a radiation beam 47 which is reflected through 90° by the reflective surface 39 of the radiation beam splitter 35, so that the radiation beam 47 is guided, via a radiation beam path 49 which extends substantially perpendicularly to the optical axis 45 of the lens system 43 and substantially perpendicularly to the radial directions X and X', through the collimator lens 41 to the scanning unit 27. The radiation beam 47 enters the housing 29 of the scanning unit 27 via an opening 51 and, as shown in FIG. 3, is reflected, by means of a mirror 53 which is secured in the housing 29, in the direction of the optical axis 45 of the lens system 43. The radiation beam 47 is subsequently focused by the lens system 43 into a scanning spot 55 on the information layer 15 of the information carrier 9. The radiation beam 47 is reflected by the information layer 15 and focused onto an optical detector 57 via the lens system 43, the mirror 53, the radiation beam path 49, the collimator lens 41 and the radiation beam splitter 35, said optical detector being of a customary type which is known per se and is attached to the slide 21 at a location which, with respect to the scanning unit 27, is situated behind the radiation beam splitter 35. To read information present on the information carrier 9, the radiation source 31 generates a continuous radiation beam 47, the optical detector 57 supplying a detection signal which corresponds to a series of elementary information characteristics on the information track of the information carrier 9, said elementary information characteristics being present one after another in the scanning spot 55. To write information on the information carrier 9, the radiation source 31 generates a radiation beam 47 which corresponds to the information to be written, a series of successive elementary information characteristics on the information track of the information carrier 9 being generated in the scanning spot 55.

The lens system 43 is secured in a holder 59 which is suspended from a connection block 63 by means of four metal, elastic rods 61 which extend transversely to the optical axis 45 of the lens system 43 and transversely to the radial directions X and X', said connection block being secured in the housing 29. It is noted that FIG. 2 only shows three of the four elastic rods 61, while FIG. 3 only shows two of the four elastic rods 61. The use of the four elastic rods 61 enables the lens system 43 to be moved with respect to the connection block 63, thereby elastically deforming the elastic rods 61, over relatively small distances in directions parallel to the radial directions X and X' and parallel to the optical axis 45 of the lens system 43. For this purpose, the scanning unit 27 comprises a first actuator 65, which will be described in greater detail hereinafter, by means of which the lens system 43 can be moved with respect to the connection block 63 in a direction parallel to the optical axis 45 of the lens system 43, and a second actuator 67 by means of which the lens system 43 can be moved with respect to the connection block 63 in a direction parallel to the radial directions X and X'. By moving the lens system 43 by means of the first actuator 65 in a direction parallel to the optical axis 45 of the lens system 43, the scanning spot 55 is focused on the information layer 15 of the information carrier 9 with a desired degree of accuracy. By moving the lens system 43 by means of the second actuator 67 in a direction parallel to the radial directions X and X', the scanning spot 55 is maintained, with a desired accuracy, on the information track to be followed. For this purpose, the first actuator 65 and the second actuator 67 are controlled by the above-mentioned control unit of the optical player, which receives both a focus-error signal and a tracking-error signal from the optical detector 57. Since the radiation source 31, the radiation beam splitter 35, the collimator lens 41 and the optical detector 57 are secured to the slide 21 in fixed positions, the first actuator 65 and the second actuator 67 only have to move the lens system 43, so that the mass to be displaced by the actuators 65 and 67, and the dimensions of the mass to be displaced by said actuators are limited substantially.

The first actuator 65 is provided with an electric coil 69 which is arranged around the lens system 43, said electric coil being only partly shown in FIG. 2 and completely shown in FIG. 5. By means of a winding process which will be described in greater detail hereinbelow, the coil 69 is provided in a coil holder 71 which forms an integral part of the holder 59, said coil holder 71 being shown in FIG. 4. In operation, the coil cooperates with a magnetic circuit 73 of the scanning unit 27, which is shown in FIGS. 2 and 3, and which is secured in the housing 29. The magnetic circuit 73 comprises two pairs of magnets 75 which lie opposite to each other and which are each magnetized in a direction, shown in FIG. 2, at right angles to the optical axis 45 of the lens system 43 and approximately at right angles to the radial directions X and X'. The magnetic circuit 73 further comprises a plate-shaped closing yoke 77 and two yokes 79 which are each provided on the closing yoke 77 between, respectively, one of the pairs of magnets 75. It is noted that the yokes 79 are not shown in FIG. 2, while in FIG. 3 only one of the two yokes 79 is shown. Between the magnets 75 and the yokes 79 there are four air gaps 81 wherein wire portions 83, 83', 83" and 83''' of the coil 69 are present, which extend substantially perpendicularly to the optical axis 45 of the lens system 43 and, viewed parallel to the optical axis 45 of the lens system 43, are arranged in a side-by-side relationship. Said wire portions 83, 83', 83", 83''' are shown in FIG. 5, wherein also the magnetic field B of the magnets 75 in the air gaps 81 is shown. In operation, a Lorentz force is generated by interaction between the magnetic field B and an electric current in the coil 69, which Lorentz force is directed substantially parallel to the optical axis 45 of the lens system 43, and, under the influence of said Lorentz force, the lens system 43 is displaced in a direction parallel to the optical axis 45.

The second actuator 67 is provided with two series-arranged electric coils 85 and 87 which, viewed in the radial directions X and X', are provided on either side of the lens system 43. The coils 85 and 87 are only partly shown in FIG. 2 and substantially completely shown in FIG. 5. After the provision of the coil 69, the coils 85 and 87 are provided in two coil holders 89 and 91 by means of customary, well-known winding processes, and also cooperate with the magnetic circuit 73, said coil holders 89 and 91 being shown in FIG. 4 and also forming an integral part of the holder 59. For this purpose, the coils 85 and 87 each comprise wire portions 93, 93', 93" and 93''' which extend substantially parallel to the optical axis 45 of the lens system 43 and which are also situated in the air gaps 81 of the magnetic circuit 73. Said wire portions 93, 93', 93", 93''' are shown in FIG. 5. In operation, a Lorentz force is generated by interaction between the magnetic field B of the magnets 75 in the air gaps 81 and an electric current in the coils 85 and 87, which Lorentz force is directed substantially parallel to the radial directions X and X', and under the influence of said Lorentz force the lens system is displaced in a direction parallel to the radial directions X and X'. The current in the coil 69 of the first actuator 65 is supplied via two of the four metal elastic rods 61, while the current in the series-arranged coils 85 and 87 is supplied via the two other elastic rods 61.

As shown in FIGS. 2 and 5, the electric coil 69 of the first actuator 65, which coil is arranged around the lens system 43, is provided with a passage 95 for the radiation beam path 49, which passage is provided in the coil 69 during the winding process in a manner which will be described in greater detail hereinafter. A sectional view of the passage 95 is also shown in FIG. 3. Said passage 95 is provided at the location of further wire portions 97 of the coil 69, which are present close to the radiation beam path 49, by bending said further wire portions 97 in a direction substantially parallel to the optical axis 45 of the lens system 43. The use of the passage 95 enables the radiation beam path 49 and the mirror 53 to be arranged, viewed in a direction parallel to the optical axis 45 of the lens system 43, in the direct vicinity of the lens system 43, so that the dimensions of the scanning unit 27, the scanning device 17 and the optical player can be limited substantially, viewed in a direction parallel to the optical axis 45 of the lens system 43. Since the two electric coils 85 and 87 of the second actuator 67 are arranged, viewed parallel to the radial directions X and X', on either side of the lens system 43, and the radiation beam path 49 extends substantially perpendicularly to the radial directions X and X' between the two coils 85 and 87, as shown in FIG. 2, the coils 85 and 87 are situated outside the radiation beam path 49, so that the shape and the dimensions of the coils 85 and 87 do not have to be adapted to the position of the radiation beam path 49.

The above-mentioned winding process, by means of which the electric coil 69 of the first actuator 65 is arranged around the holder 59 of the lens system 43, is diagrammatically shown in the FIGS. 6a and 6b. In accordance with the shown winding process, the holder 59 is secured onto a spindle 99 of a winding machine which is not shown in detail in the figures. The holder 59 is secured onto the spindle 99 in such a manner that the optical axis 45 of the lens system 43 to be secured in the holder 59 substantially coincides with an axis of rotation 101 of the spindle 99. In the winding process, use is made of a mandrel 103 which is attached to the spindle 99 and arranged in the passage 95 to be formed. The mandrel 103 has a smooth guide surface 105 which is obliquely arranged with respect to the axis of rotation 101 and blends with an end face 107 of the mandrel 103, which end face extends transversely to the axis of rotation 101. During winding the coil 69, the spindle 99 with the holder 59 are rotated about the axis of rotation 101, and a wire 109 to be wound is supplied via a wire-feeding element 111 of the winding machine, which element can be moved in a direction parallel to the axis of rotation 101. By moving the wire-feeding element 111 in a direction parallel to the axis of rotation 101 during the winding process, the above-mentioned wire portions 83, 83', 83" and 83'" of the coil 69 are arranged, viewed in a direction parallel to the axis of rotation 45, next to each other in the coil holder 71, and, viewed in a direction at right angles to the optical axis 45, of course more than one winding layer can be formed. As shown in the FIGS. 4, 6a and 6b, close to the passage 95 to be formed, the coil holder 71 has a curved seating 113 for the further wire portions 97 to be formed of the coil 69. During the winding process, the wire 109 to be wound periodically engages the guide surface 105 of the mandrel 103. If the wire 109 engages the guide surface 105, the wire 109 slides, under the influence of a tensile force present in the wire 109, in a direction R indicated in FIG. 6b, over the guide surface 105 and over the end face 107 of the mandrel 103 into the seating 113 for the further wire portions 97 to be formed of the coil 69, so that the passage 95 is kept clear. The passage 95 is thus formed in that, during the winding process, the further wire portions 97 of the coil 69 are bent by means of the mandrel 103 in a direction parallel to the optical axis 45 of the lens system 43 under the influence of the tensile force present in the wire 109. In this manner, the passage 95 is formed in a simple manner, and the number of process steps required is limited substantially in that, during the winding process, the coil 69 is not only formed but also secured to the holder 59, and also the passage 95 is provided in the coil 69. By using the curved seating 113, the further wire portions 97 are accurately positioned, during the bending operation, around the passage 95 to be formed. It is noted that, in FIG. 6b, an indicated height $H_1$ of the coil holder 71 near the curved seating 113 does not have to be equal to a height $H_2$, also indicated in FIG. 6b, of the other parts of the coil holder 71. To limit the dimensions of the holder 59, viewed in a direction parallel to the optical axis 45, it is desirable for the height $H_1$ to be substantially smaller than the height $H_2$. It will be clear that in such a case, during the winding process, a number of winding layers formed near the seating 113 will be larger than a number of winding layers formed in the other parts of the coil holder 71. Such a difference in the number of winding layers is shown in FIG. 3, in that a thickness $T_1$ of the coil 69 near the seating 113 is larger than a thickness $T_2$ of the coil 69 in the other parts of the coil holder 71. As is customary, the wire 109 is provided with a so-called thermo-adhesive layer. After the winding process, the coil 69 is heated by means of, for example, a relatively large electric current through the coil 69, the position of the mandrel 103 in the passage 95 of the coil 69 being maintained. As a result of said heating of the coil 69, the thermo-adhesive layer melts, whereafter the wires of the coil 69 are bonded together during cooling of the coil 69 and curing of the thermo-adhesive. As a result, the passage 95 formed in the coil 69 is fixed, whereafter the mandrel 103 can be removed.

The above-described winding process can be simplified substantially if instead of bending the further wire portions 97 of the coil 69 already during the winding process using the mandrel 103, they are not bent until after the winding process, in a direction substantially parallel to the optical axis 45. In this alternative embodiment, the wire 109 is wound, during the winding process, so as to form a uniform coil packet with a substantially constant height and thickness. At the location of the passage 95 to be formed, for example a plate-shaped auxiliary body is provided prior to the winding process, so that the length of the further wire portions 97 of the coil 69, which are present at the location of the passage 95 to be formed, suffices to enable said wire portions to be sufficiently bent after the winding process. The bending of the further wire portions 97 by means of a suitable bending tool takes place after the winding process and after removing said auxiliary body. After bending the further wire portions 97, the wires of the coil 69 are bonded together by melting and curing the thermo-adhesive layer of the wires. Since, also in this alternative embodiment, the coil 69 is also attached to the holder 59 during the winding process, the number of process steps necessary to manufacture and provide the coil 69 are limited also in this alternative embodiment. Since the passage 95 is formed in the coil 69 by bending the further wire portions 97 of the coil 69 which are present close to the radiation beam path 49, only a relatively small part of the coil 69 is bent, so that also in this alternative embodiment, the process of manufacturing the coil is relatively simple.

By means of the above-described optical player in accordance with the invention and the optical scanning device 17 in accordance with the invention, information present on the information track can be read, or information can be written on the information track, during scanning the information track of the information carrier 9. It is noted that the invention also relates to optical players and optical scanning devices by means of which only information present on an information track of an information carrier can be read.

In the above-described optical scanning device 17, the radiation beam path 49 extends substantially perpendicularly to the radial directions X and X', and the radiation source 31, the radiation beam splitter 35, the collimator lens 41 and the detector 57 are attached to the slide 21. Finally, it is noted that the invention also relates to optical scanning devices wherein the radiation beam path extends parallel to the radial directions X, X'. In such an embodiment, the radiation source, the radiation beam splitter, the collimator lens and the detector may also be attached to the slide, but said optical components may alternatively be attached, for example, to a stationary frame of the optical player with respect to which the slide can be moved.

What is claimed is:

1. An optical scanning device comprising:
   a basic part;
   an optical lens system with an optical axis for focusing a radiation beam into a scanning spot on an information carrier;
   an actuator for displacing the lens system relative to the basic part of the scanning device in a direction parallel to the optical axis, the actuator being provided with;
   an electric coil arranged around the lens system, which electric coil is provided with;
   wire portions which extend substantially perpendicular to the optical axis and, viewed in a direction parallel to the optical axis, are arranged next to one another; and
   a passage for a radiation beam path extending substantially perpendicular to the optical axis;
   and in which the electric coil is adapted for winding the coil in site about a coil holder to which the lens system is attached, the passage in the coil being formed within a side of the electric coil by further wire portions of the coil, which are situated near the radiation beam path, and extend in a direction substantially parallel to the optical axis.

2. The device of claim 1, in which the further wire portions of the coil are bent in said direction forming the passage.

3. The device of claim 1, in which the further wire portions of the coil are pliable allowing bending after the winding process.

4. The device of claim 1, in which the coil holder is provided, near the passage, with a curved seating for the further wire portions of the coil.

5. The device of claim 1, in which the scanning device is provided with a further actuator for displacing the lens systems relative to the basic part in a radial direction at right angles to the optical axis and at right angles to an information track on the information carrier to be scanned, the further actuator being provided with two electric coils which, viewed in the radial direction, are provided on either side of the lens system, and the radiation beam path extending, substantially at right angles to the radial direction, between the two coils of the further actuator, while the radiation source is attached to the basic part.

6. An optical player comprising:
   a table which can be rotated about an axis of rotation;
   an optical scanning device including an optical lens system for scanning an information track of an optically scannable information carrier which can be placed on the table; and
   a displacement device by means of which, in operation, at least the lens system of the scanning device can be displaced with respect to the axis of rotation mainly in a radial direction;
   an in which the optical scanning device includes;
   a basic part;
   a radiation source;
   an optical lens system with an optical axis for focusing a radiation beam supplied, in operation, by the radiation source into a scanning spot on an information carrier; and
   an actuator for displacing the lens system relative to the basic part of the scanning device in a direction parallel to the optical axis, the actuator being provided with;
   an electric coil arranged around the lens system, which electric coil is provided with;
   wire portions which extend substantially perpendicular to the optical axis and, viewed in direction parallel to the optical axis, are arranged next to one another; and
   a passage for a radiation beam path extending substantially perpendicular to the optical axis;
   and in which the electric coil is adapted for winding the coil in site about a coil holder to which the lens system is attached, the passage in the coil being formed by bending further wire portions at a side of the coil, which are situated near the radiation beam path, in a direction substantially parallel to the optical axis.

7. An optical scanning device comprising:
   a basic part;
   an optical lens system for focusing a radiation beam into a scanning spot on the information carrier, the optical lens system having an optical axis; and
   an actuator for displacing the lens system relative to the basic part of the scanning device in a direction parallel to the optical axis, the actuator being provided with;
   an electric coil arranged around the lens system, which electric coil is provided with;
   wire portions extending perpendicular to the optical axis and;
   viewed in a direction parallel to the optical axis, are arranged adjacently end-to-end; and
   a passage for a radiation beam path extending substantially perpendicular to the optical axis through one of the wire portions, the passage being formed by a bend in a portion of the one wire portion around the radiation beam path, the deflection being in a direction substantially parallel the optical axis.

* * * * *